United States Patent
Hailer et al.

(10) Patent No.: US 11,511,655 B2
(45) Date of Patent: Nov. 29, 2022

(54) HEAD RESTRAINT OF A VEHICLE SEAT

(71) Applicant: Bayerische Motoren Werke Aktiengesellschaft, Munich (DE)

(72) Inventors: Ingmar Hailer, Heping District (CN); Rolf Lechner, Munich (DE); Robert Lenz, Munich (DE); Felix Warnbacher, Vaterstetten (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/980,127

(22) PCT Filed: Mar. 6, 2019

(86) PCT No.: PCT/EP2019/055540
§ 371 (c)(1),
(2) Date: Sep. 11, 2020

(87) PCT Pub. No.: WO2019/174987
PCT Pub. Date: Sep. 19, 2019

(65) Prior Publication Data
US 2021/0245640 A1    Aug. 12, 2021

(30) Foreign Application Priority Data
Mar. 13, 2018    (DE) ...................... 10 2018 203 735.3

(51) Int. Cl.
*B60N 2/888*    (2018.01)
*B60N 2/865*    (2018.01)
*B60N 2/80*    (2018.01)

(52) U.S. Cl.
CPC ............. *B60N 2/888* (2018.02); *B60N 2/865* (2018.02); *B60N 2002/899* (2018.02)

(58) Field of Classification Search
CPC ..... B60N 2/888; B60N 2/865; B60N 2/42709
See application file for complete search history.

(56) References Cited

U.S. PATENT DOCUMENTS 6,158,812 A    12/2000  Bonke
6,568,754 B1*  5/2003  Norton .................. B60R 21/207
                                                       297/216.12

(Continued)

FOREIGN PATENT DOCUMENTS

CN          1799901 A      7/2006
CN        201338547 Y     11/2009

(Continued)

OTHER PUBLICATIONS

International Search Report (PCT/ISA/210) issued in PCT Application No. PCT/EP2019/055540 dated Jun. 4, 2019 with English translation (five pages).

(Continued)

*Primary Examiner* — David R Dunn
*Assistant Examiner* — Tania Abraham
(74) *Attorney, Agent, or Firm* — Crowell & Moring LLP

(57) ABSTRACT

A head restraint of a vehicle seat includes a base element, at least one connection element positioned on the base element for connecting the base element to a backrest of a vehicle seat, a bearing element having a contact surface for contacting a head of a user of the vehicle seat, and a holding element which can be adjusted along a depth axis relative to the base element. The depth axis is oriented perpendicular to the contact surface. The bearing element is connected to the holding element by a damping device, wherein the damping device damps a movement of the bearing element relative to the holding element.

11 Claims, 2 Drawing Sheets

(56) References Cited

U.S. PATENT DOCUMENTS

| | | | | |
|---|---|---|---|---|
| 6,616,236 | B1* | 9/2003 | Su | A47C 7/38 248/118 |
| 6,983,995 | B1* | 1/2006 | Veine | A47C 7/38 297/391 |
| 7,073,863 | B1* | 7/2006 | Low | B60N 2/865 297/404 |
| 7,631,932 | B2* | 12/2009 | Hoffmann | B60N 2/865 297/216.12 |
| 9,022,467 | B2* | 5/2015 | Frotz | B60N 2/888 297/216.12 |
| 2005/0077762 | A1* | 4/2005 | Kraemer | B60N 2/888 297/216.12 |
| 2006/0119150 | A1 | 6/2006 | Hoffmann | |
| 2010/0201167 | A1 | 8/2010 | Wieclawski | |
| 2011/0089738 | A1* | 4/2011 | Jen | A47C 7/38 297/404 |
| 2011/0198900 | A1* | 8/2011 | Trimborn | B60N 2/888 297/216.12 |
| 2012/0223552 | A1 | 9/2012 | Dillinger | |
| 2017/0349070 | A1 | 12/2017 | Leise | |
| 2021/0213862 | A1 | 7/2021 | Beil | |

FOREIGN PATENT DOCUMENTS

| | | |
|---|---|---|
| CN | 202821889 U | 3/2013 |
| CN | 107472100 A | 12/2017 |
| CN | 113103936 A | 7/2021 |
| DE | 36 23 658 A1 | 1/1988 |
| DE | 295 04 287 U1 | 5/1995 |
| DE | 199 61 019 C1 | 2/2001 |
| DE | 102 15 137 A1 | 8/2003 |
| DE | 103 41 744 A1 | 3/2005 |
| DE | 10 2005 024 294 A1 | 11/2006 |
| DE | 20 2008 009 670 U1 | 10/2008 |
| DE | 10 2008 011 325 A1 | 9/2009 |
| DE | 10 2009 008 736 A1 | 9/2010 |
| DE | 10 2010 044 248 A1 | 4/2011 |
| DE | 10 2012 209 254 A1 | 12/2013 |
| EP | 1 526 034 A1 | 4/2005 |
| WO | WO 02/092384 A1 | 11/2002 |
| WO | WO 2011/032678 A1 | 3/2011 |

OTHER PUBLICATIONS

German-language Written Opinion (PCT/ISA/237) issued in PCT Application No. PCT/EP2019/055540 dated Jun. 4, 2019 (four pages).

German-language Search Report issued in German Application No. 10 2018 203 735.3 dated Jun. 26, 2018 with partial English translation (13 pages).

English translation of Chinese-language Office Action issued in Chinese Application No. 201980017511.5 dated Jan. 30, 2022 (six (6) pages).

* cited by examiner

HEAD RESTRAINT OF A VEHICLE SEAT

BACKGROUND AND SUMMARY OF THE INVENTION

The present invention relates to a head restraint of a vehicle seat. In addition, the invention relates to a vehicle seat comprising such a head restraint. Finally, the invention relates to a vehicle comprising such a vehicle seat having such a head restraint.

The prior art discloses systems for energy degradation during rear-end collisions of vehicles. In this regard, the prior art discloses systems in which a rearward displacement of the vehicle seat occurs in order thereby to degrade energy and in particular to support the head of a person sitting on the vehicle seat or to damp an impact of the head on the vehicle seat. Also known from the prior art is DE 10 2005 024 294 A1. This document discloses a head restraint which is formed from an irreversibly deformable material which is designed to take up energy acting on the head restraint basic body in that the density of the material in the penetration direction of the impacting head increases.

It is an object of the invention to provide a head restraint of a vehicle seat which allows secure and reliable damping of an impact movement of a head combined with simple and cost-effective production and mounting. The object is achieved by the features of the independent claim. The dependent claims contain preferred developments of the invention.

The object is thus achieved by a head restraint of a vehicle seat comprising a base element. The base element has at least one connecting element, wherein the connecting element allows a connection between the head restraint and a seat backrest of a vehicle seat. In particular, the connecting element is a rod. On the connecting element there can in particular be mounted a height adjuster for adjusting the head restraint with respect to the seat backrest. The base element and connecting element are preferably fixedly connected, although a relative rotation of the base element and connecting element may be possible. Furthermore, the head restraint comprises a bearing element having a bearing surface. The bearing surface serves for bearing the head of a user of the vehicle seat. In addition, the head restraint comprises a holding element. The holding element is adjustable with respect to the base element along a depth axis. The depth axis is in particular oriented perpendicular to the bearing surface. The holding element thus allows a depth adjustment of the head restraint by the holding element being displaced relative to the base element. The bearing element is attached to the holding element. In particular, the bearing element is connected to the holding element via a damping device. It is thus ensured that an impact of a head on the bearing element is damped. The damping device is designed to damp a movement of the bearing element relative to the holding element. In particular, an impact of the head of the user on the head restraint is damped in that a movement of the bearing element on which the head impacts is damped in the direction of the holding element by the damping device. There thus occurs a movement of the bearing element relative to the holding element, with this movement being damped. As a result, energy can be absorbed such that impact energy of the head on the head restraint is reduced. In particular, the invention makes it possible for the damping to be decoupled from the depth adjustment. It is thus preferable for both the bearing element to be displaceable relative to the holding element and for the holding element to be displaceable relative to the base element along the depth axis. However, a displacement of the holding element serves preferably only for a depth adjustment, whereas the bearing element is preferably movable only for damping an impact movement of the head on the bearing element.

The damping device preferably has a cylinder. A piston is guided in the cylinder. An air chamber is thus defined by the cylinder and the piston. There is provision that either the holding element is fixedly connected to the cylinder and the bearing element is fixedly connected to the piston, or the bearing element is fixedly connected to the cylinder and the holding element is fixedly connected to the piston. Consequently, in particular the assembly of cylinder and piston extends between the bearing element and the holding element. If a force is applied to the bearing element which acts in the direction of the holding element, a force is likewise applied to the cylinder. The air chamber advantageously serves as a damping element in order thereby to damp a movement between the holding element and bearing element. The air chamber is advantageously filled with ambient air. It is also possible for the air chamber to be filled with a specific gas.

The cylinder particularly advantageously has at least one opening. By virtue of the opening, the air chamber can be emptied by a movement of the piston. If a force is thus applied to the bearing element in the direction of the holding element, the air from the air chamber is ejected out of the cylinder through the opening by a movement of the piston. The size of the opening can be used to set a corresponding air flow in order to define the speed of the emptying of the air chamber. In particular, a plurality of openings can be present. In addition, a valve can be present in the opening. A corresponding choice of the opening thus makes it possible to set a damping action of the damping device in a simple manner with little effort.

The opening preferably has an overpressure valve. The air chamber can thus be emptied only when an internal pressure in the cylinder exceeds a predefined minimum pressure. As a result, the piston can be moved only when a predefined minimum force acts on the bearing surface and the bearing element in the direction of the holding element. This prevents a situation in which the damping device becomes active during normal operation of the head restraint. Rather, the mode of action of the damping element is restricted only to damping an impact of the head of the user of the head restraint. The head restraint can thus be used in vehicles in a simple manner with little effort, with damping being carried out only in a crash situation.

The damping device advantageously comprises a web element. The web element is arranged between the bearing element and holding element. In addition, the web element has a predetermined breaking point. The web element thus serves as a spacer in order to transmit forces between the bearing element and the holding element. If the force to be transmitted exceeds a predetermined minimum force, the predetermined breaking point is broken and a relative movement between the bearing element and holding element is made possible. In addition to the above-described combination of cylinder and piston, it is thus possible to ensure that the damping device becomes active only when a predefined minimum force acts on the bearing element. A situation can thus be achieved in which damping occurs only when this is necessary, that is to say if the head of a user impacts the bearing surface. During normal operation of the head restraint, force transmission can occur via the web element, whereby no damping action at all is present.

The damping device can be designed in particular as a deformation element. The deformation can be irreversible or reversible. In each case, the deformation element makes it possible to damp an impact impulse of a head on the bearing surface and thus on the bearing element.

The damping device is advantageously designed in such a way that no restoring force can be exerted by it. If a displacement of the bearing element occurs in the direction of the holding element, the bearing element remains in the final position. The damping device serves only for damping this movement. If no more further external force is applied to the bearing element, no restoring of the bearing element to the original position occurs by means of the damping device. In particular, this avoids the head ricocheting from the bearing surface. The head restraint can thus damp an impact impulse of the head.

The head restraint preferably has a latching element or an electromechanical actuator. The latching element or the electromechanical actuator are designed to set and hold a relative position between the holding element and base element along the depth axis. It is thus possible, on the one hand, for damping of an impact of a head on the bearing element to occur by means of the damping device while at the same time, independently thereof, an adjustment of the holding element relative to the base element can occur. In particular, an adjustment of the head restraint along the depth axis and a damping function of the head restraint are thus decoupled from one another. In this way, the construction of the head restraint is simplified and a mode of action both of the damping device and of the depth adjustment is simplified.

The invention additionally relates to a vehicle seat. The vehicle seat comprises a seat surface and a seat backrest. In addition, the vehicle seat comprises a head restraint as described above. The head restraint is connected to the seat backrest by means of the connecting element. In particular, the connecting element can have detents in order to set a height adjustment of the head restraint above the seat backrest. The seat backrest can equally have an electromechanical actuator in order to allow an electromechanical height adjustment of the head restraint above the seat backrest.

Finally, the invention relates to a vehicle. The vehicle comprises a vehicle seat as described above. The vehicle, by means of the head restraint of the vehicle seat, thus allows energy which acts on the head of a user of the vehicle to be absorbed. This is particularly advantageous if the vehicle is involved in a rear-end collision, in particular if another vehicle collides with the vehicle. What often occurs in this case is an acceleration of the head of the user of the vehicle counter to a usual direction of travel of the vehicle. The head impacts the head restraint, with damping of the impact of the head on the head restraint being made possible by means of the damping device as described above.

Further details, features and advantages of the invention will become apparent from the following description and the figures.

DETAILED DESCRIPTION OF THE DRAWINGS

Figure 1:
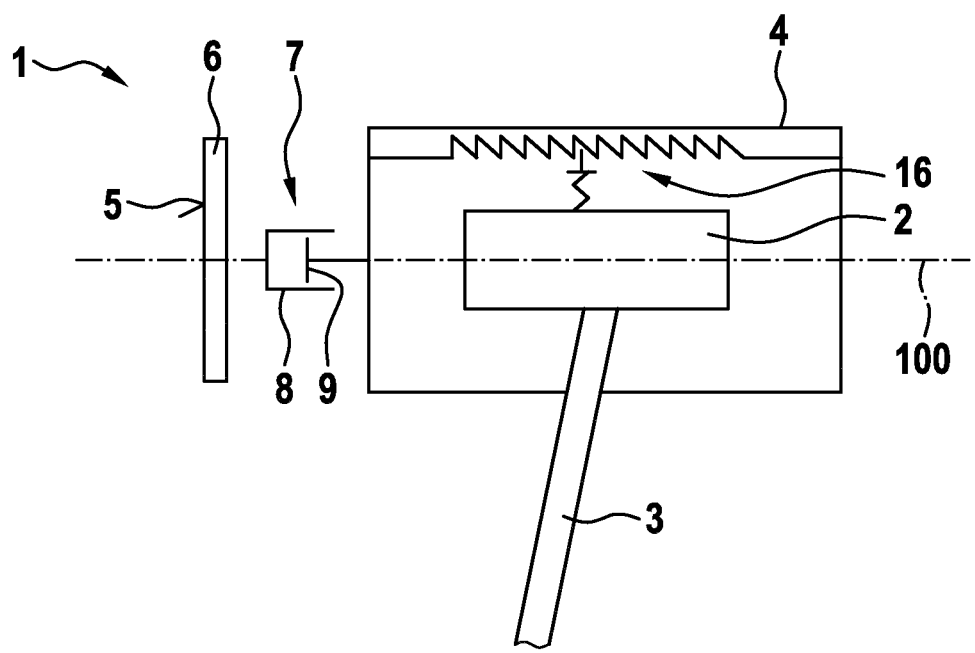
FIG. 1 is a schematic drawing of a head restraint according to an exemplary embodiment of the invention.

FIG. 1 schematically shows a head restraint 1 according to an exemplary embodiment of the invention. The head restraint 1 comprises a base element 2 and a connecting element 3. The head restraint 1 can be connected via the connecting element 3 to a seat backrest 13 of a vehicle seat 14 (cf. FIG. 3).

The base element 2 and the connecting element 3 are advantageously fixedly connected to one another. A relative rotation between the base element 2 and the connecting element 3 may be possible. Furthermore, there is provision that the base element 2 is coupled to a holding element 4. In particular, the base element 2 is coupled to the holding element 4 via a latching element 16. There is provision that the base element 2 and the holding element 4 are displaceable relative to one another, with it being possible for the base element 2 and holding element 4 to be locked by means of the latching element 16. This particularly allows a depth adjustment of the head restraint 1. This means that an adjustment of the holding element 4 relative to the connecting element 3 can occur along a depth axis 100.

In order to bear the head of a user of the head restraint 1, a bearing surface 5 is present on a bearing element 6. The bearing element 6 is connected to the holding element 4 via a damping device 7. In particular, a displacement of the bearing element 6 along the depth axis 100 is possible, with the result that the holding element 4 and bearing element 6 are movable relative to one another.

There is provision that the damping device 7 damps a relative movement between the bearing element 6 and holding element 4. The damped movement of the bearing element 6 thus allows energy of the head to be absorbed, with the result that the impact of the head on the head restraint 1 is damped.

To make the damping possible, the damping device 7 has a cylinder 8 in which a piston 9 is guided. The cylinder 8 is for example fixedly connected to the bearing element 6, whereas the piston 9 is fixedly connected to the holding element 4. Of course, the damping device 7 can also be mounted in a reverse manner on the holding element 4 and the bearing element 6.

Figure 2:
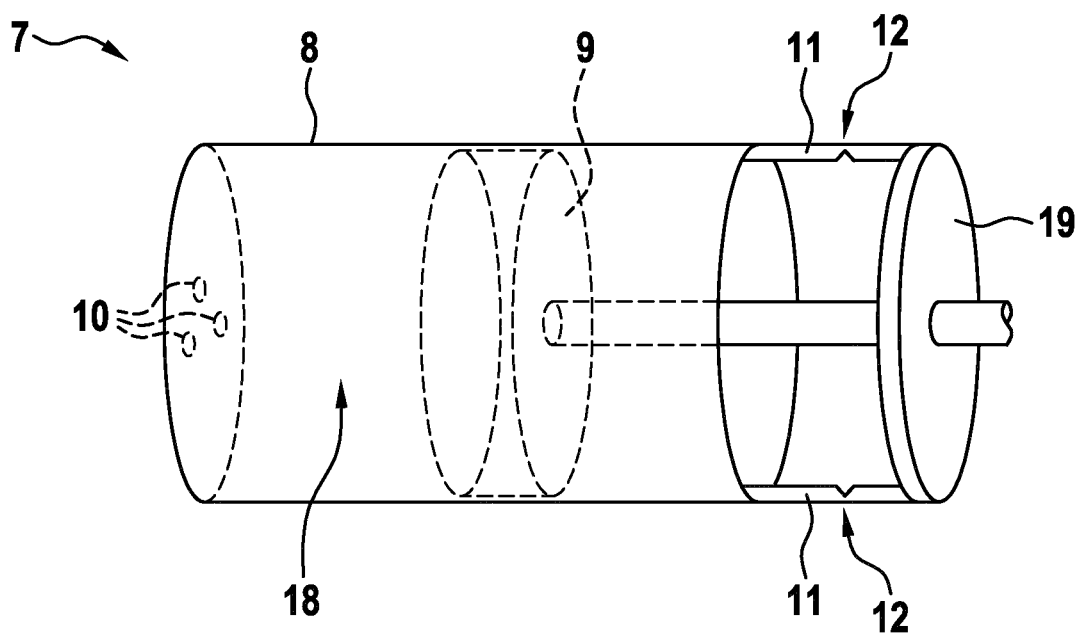
FIG. 2 is a schematic drawing of a damping device of the head restraint according to the exemplary embodiment of the invention.

As shown in FIG. 2, an air chamber 18 is formed by the cylinder 8 and the piston 9. The air chamber 18 thus acts as a damping element in order to damp the impact of the head on the head restraint 1. In particular, there is provision that the cylinder 8 has openings 10 through which air from the air chamber 18 can flow out if the piston 9 is correspondingly moved. There is particularly provision in this respect that overpressure valves are present in the openings 10, with the result that air is able to flow out only when a predefined minimum pressure is exceeded.

If an impact of the head on the bearing surface 5 of the bearing element 6 occurs, the pressure within the air chamber 18 is increased as a result of a movement of the piston 9. If the internal pressure of the air chamber 18 exceeds a predefined minimum pressure, air can flow out of the air chamber 18 through the openings 10. An air flow can be set by a cross-sectional area of the openings 10. There thus occurs damping of the movement of the piston 9 and therefore damping of the movement of the bearing element 6. As a result, the impact of the head on the head restraint 1 can be damped.

There is provision in particular that an impact of the head is introduced uniformly into the structure of the head restraint 1 by means of the bearing element 6 and the damping device 7. The damping device 7 cannot apply a restoring force. After partial or complete emptying of the air chamber 18, the piston 9 thus remains at that position at which the piston 9 is situated if no more further force is exerted on the bearing element. There occurs no restoring of a movement of the bearing element 6 by means of the damping device 7.

As already described, overpressure valves are advantageously present in the openings 10. A situation is thus prevented in which, under small loads in which no damping is necessary, displacement of the bearing element 6 occurs. This is not necessary during normal operation of the head restraint 1. In order to additionally reduce loading of the damping device 7, at least one web element 11, in particular a plurality of web elements, is or are provided. The web elements 11 are arranged between the bearing element 6 and the holding element 4. FIG. 2 shows by way of example that the webs 11 connect the cylinder 8 to an auxiliary plate 19 which is fixedly connected to the piston 9. A force can thus be transmitted directly from the bearing element 6 to the holding element 4 via the webs 11 without the damping device 7 being able to act with a damping effect. It is only upon exceeding a minimum force that breaking of predetermined breaking points 12 of the web elements 11 occurs. It is only after the breaking of the predetermined breaking points 12 that a movement of the piston 9 is thus made possible. A situation is therefore prevented in which activation of the damping device 7 occurs already during normal operation of the head restraint 1, with the result that, during normal operation, the bearing surface 5 and the bearing element 6 remain at their intended position.

Figure 3:
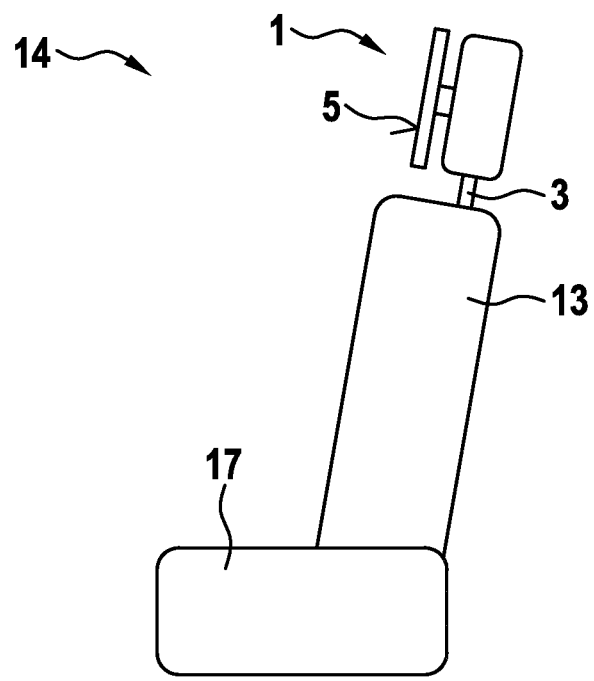
FIG. 3 is a schematic view of a vehicle seat according to an exemplary embodiment of the invention.

FIG. 3 schematically shows a vehicle seat 14 according to an exemplary embodiment of the invention. The vehicle seat 14 comprises a seat backrest 13 and a seat surface 17. In addition, the vehicle seat 14 comprises a head restraint 1 as described above. There is provision that the head restraint 1 is connected to the seat backrest 13 via the connecting element 3. In particular, there can additionally occur a height adjustment via the seat backrest and the connecting element 13. Together with the adjustment along the depth axis 100, the bearing surface 5 can thus be optimally adapted to the position of the head of a user of the vehicle seat 14.

Figure 4:
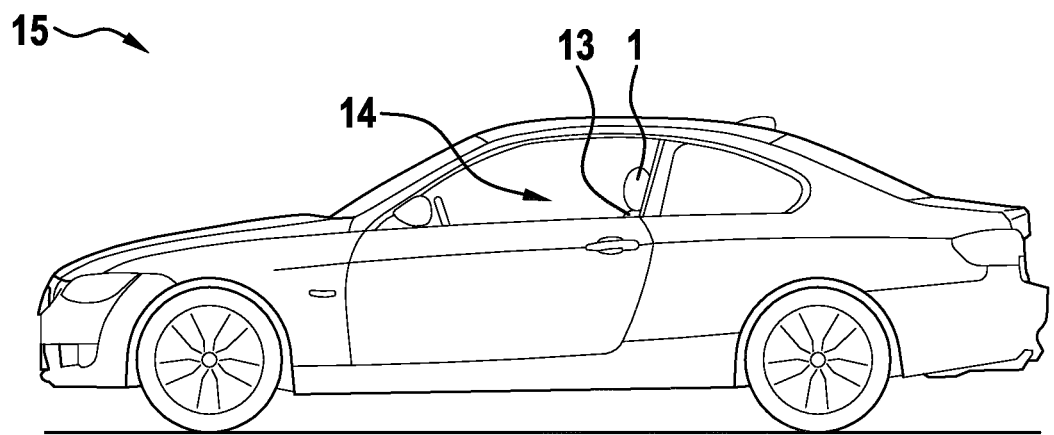
FIG. 4 is a schematic view of a vehicle according to an exemplary embodiment of the invention.

FIG. 4 finally shows a vehicle 15 according to one exemplary embodiment of the invention. The vehicle 15 comprises a vehicle seat 14 as described above, which in turn has a head restraint 1 as described above. In the event of a rear-end collision in which the vehicle 15 is involved, an impact of the head of a user of the vehicle 15 on the head restraint 1 can thus be damped.

In the exemplary embodiments described above, the focus was on a latching element 16 for carrying out the depth adjustment along the depth axis 100. Instead of this latching element 16, it is equally possible for an electromechanical actuator to be present which allows electromechanical adjustment of the holding element 4 relative to the base element 2. The damping by the damping device 7 occurs independently of the depth adjustment along the depth axis 100.

LIST OF REFERENCE SIGNS

1 Head restraint
2 Base element
3 Connecting element
4 Holding element
5 Bearing surface
6 Bearing element
7 Damping device
8 Cylinder
9 Piston
10 Opening
11 Web element
12 Predetermined breaking point
13 Seat backrest
14 Vehicle seat
15 Vehicle
16 Latching element
17 Seat surface
18 Air chamber
19 Auxiliary plate

What is claimed is:

1. A head restraint of a vehicle seat, comprising:
a base element;
at least one connecting element arranged on the base element for connecting the base element to a seat backrest of a vehicle seat;
a bearing element having a bearing surface for bearing a head of a user of the vehicle seat; and
a holding element which is adjustable with respect to the base element along a depth axis, wherein the depth axis is oriented perpendicular to the bearing surface,
wherein the bearing element is arranged only in front of the holding element in a longitudinal direction of a vehicle having the vehicle seat;
a damping device by which the bearing element is connected to the holding element, wherein the damping device damps a movement of the bearing element relative to the holding element.

2. A head restraint of a vehicle seat, comprising:
a base element;
at least one connecting element arranged on the base element for connecting the base element to a seat backrest of a vehicle seat;
a bearing element having a bearing surface for bearing a head of a user of the vehicle seat; and
a holding element which is adjustable with respect to the base element along a depth axis, wherein the depth axis is oriented perpendicular to the bearing surface,
a damping device by which the bearing element is connected to the holding element, wherein the damping device damps a movement of the bearing element relative to the holding element, wherein
the damping device has a cylinder and a piston guided in the cylinder,
an air chamber is defined by the cylinder and piston, and
either the holding element is fixedly connected to the cylinder and the bearing element is fixedly connected to the piston, or the bearing element is fixedly connected to the cylinder and the holding element is fixedly connected to the piston.

3. The head restraint according to claim 2, wherein the cylinder has at least one opening through which the air chamber is emptiable by a movement of the piston.

4. The head restraint according to claim 3, wherein the opening has an overpressure valve.

5. A head restraint of a vehicle seat, comprising:
a base element;
at least one connecting element arranged on the base element for connecting the base element to a seat backrest of a vehicle seat;

a bearing element having a bearing surface for bearing a head of a user of the vehicle seat; and
a holding element which is adjustable with respect to the base element along a depth axis, wherein the depth axis is oriented perpendicular to the bearing surface,
a damping device by which the bearing element is connected to the holding element, wherein the damping device damps a movement of the bearing element relative to the holding element,
wherein the damping device comprises one of:
(a) a cylinder and a piston guided in the cylinder,
an air chamber defined by the cylinder and piston,
wherein either the holding element is fixedly connected to the cylinder and the bearing element is fixedly connected to the piston, or the bearing element is fixedly connected to the cylinder and the holding element is fixedly connected to the piston;
or
(b) a web element arranged between the bearing element and the holding element,
wherein the web element has a predetermined breaking point; or
(c) a damping device configured as a deformation element; or
(d) a damping device where no restoring force is exerted by the damping device.

6. The head restraint according to claim 5, wherein
the damping device comprises the web element which is arranged between the bearing element and the holding element, and
the web element has the predetermined breaking point.

7. The head restraint according to claim 5, wherein
the damping device is configured as the deformation element.

8. The head restraint according to claim 5, wherein
no restoring force is exerted by the damping device.

9. The head restraint according to claim 5, further comprising:
a latching element or an electromechanical actuator for setting and holding a relative position between the holding element and base element along the depth axis.

10. A vehicle seat comprising:
a seat surface;
a seat backrest; and
a head restraint according to claim 5, wherein
the head restraint is connected to the seat backrest via the connecting element.

11. A vehicle comprising a vehicle seat according to claim 10.

* * * * *